(12) United States Patent
Hashimoto et al.

(10) Patent No.: US 10,562,532 B2
(45) Date of Patent: Feb. 18, 2020

(54) AUTONOMOUS DRIVING SYSTEM

(71) Applicant: Toyota Jidosha Kabushiki Kaisha, Toyota-shi Aichi-ken (JP)

(72) Inventors: Ryuta Hashimoto, Susono (JP); Yoshinori Watanabe, Isehara (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 156 days.

(21) Appl. No.: 15/729,141

(22) Filed: Oct. 10, 2017

(65) Prior Publication Data

US 2018/0148060 A1    May 31, 2018

(30) Foreign Application Priority Data

Nov. 29, 2016 (JP) ................. 2016-231721

(51) Int. Cl.
| | | |
|---|---|---|
| *B60W 30/18* | (2012.01) | |
| *G06K 9/00* | (2006.01) | |
| *B62D 15/02* | (2006.01) | |

(52) U.S. Cl.
CPC ... *B60W 30/18163* (2013.01); *B62D 15/0255* (2013.01); *G06K 9/00798* (2013.01); *B60W 2540/00* (2013.01); *B60W 2540/30* (2013.01); *B60W 2550/12* (2013.01); *B60W 2550/146* (2013.01); *B60W 2550/308* (2013.01)

(58) Field of Classification Search
CPC ....... B60W 30/18163; B60W 2540/00; B60W 2540/30; B60W 2550/12; B60W 2550/146; B60W 2550/308; B62D 15/0255; G06K 9/00798; G06N 5/00; G05D 1/0088

USPC .......................................................... 701/23
See application file for complete search history.

(56) References Cited

U.S. PATENT DOCUMENTS

| | | | | |
|---|---|---|---|---|
| 9,457,807 | B2* | 10/2016 | Lee ..................... | B60W 30/09 |
| 2016/0091896 | A1 | 3/2016 | Maruyama | |
| 2017/0242435 | A1* | 8/2017 | Nilsson ................. | B60W 30/16 |
| 2017/0320521 | A1* | 11/2017 | Fujita ...................... | B62D 6/00 |
| 2017/0349181 | A1* | 12/2017 | Wei ................ | B60W 30/18163 |

FOREIGN PATENT DOCUMENTS

| | | |
|---|---|---|
| JP | 2012-123606 A | 6/2012 |
| JP | 2013-544695 A | 12/2013 |
| JP | 2015-155857 A | 8/2015 |
| JP | 2016-071513 A | 5/2016 |
| WO | 2012/047743 A2 | 4/2012 |

* cited by examiner

*Primary Examiner* — Anthony R Jimenez
(74) *Attorney, Agent, or Firm* — Dinsmore & Shohl LLP

(57) ABSTRACT

An autonomous driving system includes: an information acquisition device configured to acquire driving environment information indicating driving environment for a vehicle; and a lane change control device configured to control lane change of the vehicle based on the driving environment information. When determining that the lane change can be started at a standard timing, the lane change control device performs delay processing that delays an actual start timing of the lane change from the standard timing. The lane change control device variably sets a delay time from the standard timing to the actual start timing according to the driving environment.

12 Claims, 12 Drawing Sheets

| EXAMPLES OF DELAY MAP ||
|---|---|
| INPUT PARAMETER (MAINLY RELATING TO ROAD) | DELAY TENDENCY |
| LANE RELATIVE ANGLE | ·LARGER LANE RELATIVE ANGLE → LARGER DELAY<br><br>·SMALLER LANE RELATIVE ANGLE → SMALLER DELAY |
| NUMBER OF LANES | ·LARGER NUMBER OF LANES → LARGER DELAY<br><br>·SMALLER NUMBER OF LANES → SMALLER DELAY |
| LANE CURVATURE | ·LARGER LANE CURVATURE → LARGER DELAY<br><br>·SMALLER LANE CURVATURE → SMALLER DELAY |
| LANE WIDTH | ·SMALLER LANE WIDTH → LARGER DELAY<br><br>·LARGER LANE WIDTH → SMALLER DELAY |
| VISIBILITY LEVEL OF WHITE LINE | ·LOWER VISIBILITY LEVEL → LARGER DELAY<br><br>·HIGHER VISIBILITY LEVEL → SMALLER DELAY |

*Fig. 7*

| EXAMPLES OF DELAY MAP ||
|---|---|
| INPUT PARAMETER (MAINLY RELATING TO SURROUNDING VEHICLE) | DELAY TENDENCY |
| NUMBER OF SURROUNDING VEHICLES | · LARGER NUMBER OF VEHICLES → LARGER DELAY<br><br>· SMALLER NUMBER OF VEHICLES → SMALLER DELAY |
| INTER-VEHICLE DISTANCE IN TARGET LANE | · SMALLER INTER-VEHICLE DISTANCE → LARGER DELAY<br><br>· LARGER INTER-VEHICLE DISTANCE → SMALLER DELAY |
| DISTANCE TO SURROUNDING VEHICLE | · SMALLER DISTANCE → LARGER DELAY<br><br>· LARGER DISTANCE → SMALLER DELAY |
| SIZE OF SURROUNDING VEHICLE | · LARGER SIZE → LARGER DELAY<br><br>· SMALLER SIZE → SMALLER DELAY |
| RELATIONSHIP BETWEEN SURROUNDING VEHICLE AND LANE | · ON LANE BOUNDARY → LARGER DELAY<br><br>· WITHIN LANE → SMALLER DELAY |
| TYPE OF MOVING TARGET | · MOTORBIKE, BICYCLE, PEDESTRIAN, ANIMAL → LARGER DELAY |

*Fig. 8*

| EXAMPLES OF DELAY MAP ||
| --- | --- |
| INPUT PARAMETER (OTHER EXTERNAL FACTORS) | DELAY TENDENCY |
| WEATHER | ·RAIN (LOWER VISIBILITY) → LARGER DELAY<br><br>·FINE (HIGHER VISIBILITY) → SMALLER DELAY |
| HOUR | ·NIGHT (LOWER VISIBILITY) → LARGER DELAY<br><br>·DAY (HIGHER VISIBILITY) → SMALLER DELAY |
| ABNORMAL EVENT | ·ANY ABNORMAL EVENT → LARGER DELAY<br><br>·NO ABNORMAL EVENT → SMALLER DELAY |

*Fig. 9*

| EXAMPLES OF DELAY MAP ||
| --- | --- |
| INPUT PARAMETER (MAINLY RELATING TO DRIVER) | DELAY TENDENCY |
| AGE | ·OLDER AGE → LARGER DELAY<br><br>·YOUNGER AGE → SMALLER DELAY |
| DRIVING EXPERIENCE | ·SHORTER EXPERIENCE → LARGER DELAY<br><br>·LONGER EXPERIENCE → SMALLER DELAY |
| DRIVER'S SETTING | ·PREFERENCE TO LEEWAY → LARGER DELAY<br><br>·PREFERENCE TO QUICKNESS → SMALLER DELAY |

*Fig. 10*

AUTONOMOUS DRIVING SYSTEM

CROSS-REFERENCE TO RELATED APPLICATIONS

This application claims priority to Japanese Patent Application No. 2016-231721 filed Nov. 29, 2016, which is incorporated herein by reference.

BACKGROUND

Technical Field

The present disclosure relates to an autonomous driving technique for a vehicle. In particular, the present disclosure relates to lane change control in autonomous driving.

Background Art

Patent Literature 1 discloses a lane change control device. The lane change control device estimates a stress level of a driver when making a lane change in a lane merging area. Then, the lane change control device determines a timing at which the stress level becomes for and executes the lane change at that timing.

Patent Literature 2 discloses a driving assist control device. When determining that lane change is possible, the driving assist control device suggests lane change to a driver. If the driver approves the lane change, the driving assist control device executes the lane change. On the other hand, it the driver does not approve the lane change, the driving assist control device does not execute the lane change.

LIST OF RELATED ART

Patent Literature 1: Japanese Laid-Open Patent Publication No. 2012-123606
Patent Literature 2: Japanese Laid-Open Patent Publication No. 2016-71513

SUMMARY

When an autonomous driving system automatically makes a lane change of a vehicle, a driver of the vehicle may also check a surrounding situation just to be sure. However, the driver (human) and the autonomous driving system are different in speed of recognition and judgment, and in general the autonomous driving system is faster. Therefore, even if the autonomous driving system determines that the lane change can be started, it is highly probable that the driver has not yet completed checking the surrounding situation and not yet reached a stage of making a determination. If the lane change is automatically started at a timing determined by the autonomous driving system as disclosed in the above-mentioned Patent Literature 1, the driver feels senses of anxiety and strangeness, which causes decrease in confidence in the autonomous driving system.

An object of the present disclosure is to provide an autonomous driving technique that can reduce driver's senses of anxiety and strangeness at a start of a lane change.

In an aspect of the present disclosure, an autonomous driving system is provided.

The autonomous driving system includes:
an information acquisition device configured to acquire driving environment information indicating driving environment for a vehicle; and
a lane change control device configured to control lane change of the vehicle based on the driving environment information.

When determining that the lane change can be started at as standard timing, the lane change control device performs delay processing that delays an actual start timing of the lane change from the standard timing.

The lane change control device variably sets a delay time from the standard timing to the actual start timing according to the driving environment.

For example, the driving environment includes an angle between a current travel lane and a target lane of the lane change. In this case, the delay time increases as the angle becomes larger.

For example, the driving environment includes a number of lanes existing in a direction of the lane change. In this case, the delay time increases as the number of lanes becomes larger.

For example, the driving environment includes a curvature of a lane at a current position. In this case, the delay time increases as the curvature becomes larger.

For example, the driving environment includes a number of surrounding vehicles. In this case, the delay time increases as the number of surrounding vehicles becomes larger.

For example, the driving environment includes an inter-vehicle distance in a target lane of the lane change. In this case, the delay time increases as the inter-vehicle distance becomes smaller.

For example, the driving environment includes a relationship between a surrounding vehicle and a lane. The delay time when the surrounding vehicle is on a boundary of the lane is larger than the delay time when the surrounding vehicle is within the lane.

For example, the driving environment includes visibility that depends on weather or hour. In this case, the delay time increases as the visibility becomes lower.

For example, the driving environment includes driving experience of a driver. In this case, the delay time increases as the driving experience becomes shorter.

When urgency of the lane change exceeds threshold, the lane change control device may start the lane change without waiting for the start timing.

The autonomous driving system according to the present disclosure actively performs the delay processing even when it determines that the lane change can be started at the standard timing. By the delay processing, the actual start timing of the lane change is delayed from the standard timing for a delay time according to the driving environment. As much as the delay time, more time is secured for the driver to check the surroundings. As a result, the driver's senses anxiety and strangeness at the start of the lane change are reduced, which contributes to increase in the driver's confidence in the autonomous driving system.

BRIEF DESCRIPTION OF DRAWINGS

FIG. 7 is a conceptual diagram for explaining design examples of a delay map in the embodiment of the present disclosure;

FIG. 8 is a conceptual diagram for explaining design examples of the delay map in the embodiment of the present disclosure;

FIG. 9 is a conceptual diagram for explaining design examples of the delay map in the embodiment of the present diselosuredisclosure;

FIG. 10 is a conceptual diagram for explaining design examples of the delay map in the embodiment of the present disclosure;

EMBODIMENTS

Embodiments of the present disclosure will be described below with reference to the attached drawings.

1. Outline

Figure 1:
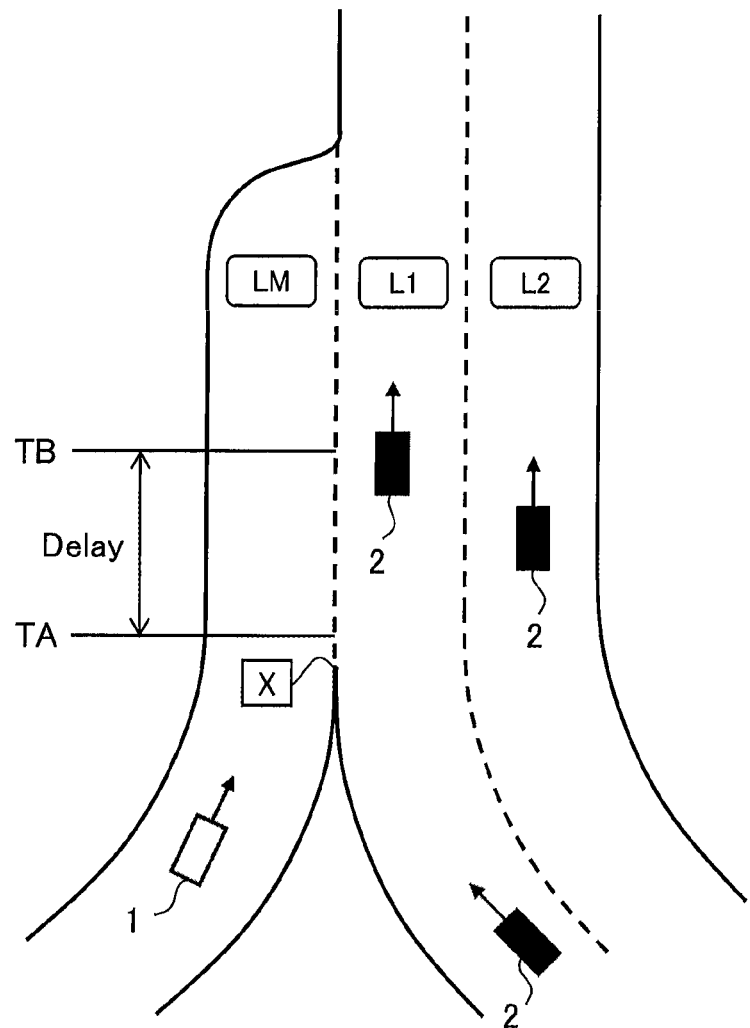
FIG. 1 is a conceptual diagram for explaining an outline of an autonomous driving system according to an embodiment of the present disclosure.

FIG. 1 is a conceptual diagram for explaining an outline of an autonomous driving system according to the present embodiment. The autonomous driving system is mounted on a vehicle 1 and controls autonomous driving of the vehicle 1. Let us consider a case where the autonomous driving system makes a lane change of the vehicle 1. As one example, let us consider a lane change at merging as shown in FIG. 1. The vehicle 1 traveling in a merge lane LM is going to move from the merge lane LM to an adjacent lane L1 in a merge zone. A start position of the merge zone is indicated by "X".

The autonomous driving system determines a timing at which the lane change can be started. For example, the autonomous driving system refers to a map data to recognize lane information such as a lane geometry and the merge zone in front of the vehicle 1. Moreover, the autonomous driving system recognizes a situation of surrounding vehicles 2 based on detected information obtained by a sensor. Based on the lane information, the situation of the surrounding vehicles 2 and so forth, the autonomous driving system determines the timing at which the lane change can be started. In the example shown in FIG. 1, it is assumed that the autonomous driving system determines that the lane change can be started at a timing TA. Such the timing TA based on the determination by the autonomous driving system is hereinafter referred to as a "standard timing TA".

At the time of the lane change performed by the autonomous driving system, a driver of the vehicle 1 may also check a surrounding situation just to be sure. However, the driver (human) and the autonomous driving system are different in speed of recognition and judgment, and in general the autonomous driving system is faster. Therefore, even if the autonomous driving system determines that the lane change can be started, it is highly probable, that the driver has not yet completed checking the surrounding situation and not yet reached a stage of making a determination. Therefore, if the lane change is automatically started at the standard timing TA determined by the autonomous driving system, the driver feels senses of anxiety and strangeness, which causes decrease in confidence in the autonomous driving system.

In view of the above, the autonomous driving system according to the present embodiment performs delay processing that actively delays a start timing of the lane change, in order to make a time for the driver to check the surrounding situation. That is, the autonomous driving system according to the present embodiment actively delays an actual start timing TB from the standard timing TA, even if it has determined that the lane change can be started at the standard timing TA. Here, the term "actively" means that the delay according to the present embodiment is different from general signal delay and response delay which are inevitably caused during signal processing and signal transmission.

In some embodiments, a delay time (TB–TA) from the standard timing TA to the actual start timing TB is set to a length that allows the driver to sufficiently check the surrounding situation. In other words, in some embodiments a time required for checking the surrounding situation (this time is hereinafter referred to as a "check time") is reflected in the delay time. Such the check time depends on driving environment for the vehicle 1.

For example, when there are a lot of surrounding vehicles 2, the driver needs to pay attention to respective behaviors of the surrounding vehicles 2, and thus the check time becomes long. As another example, when there are a lot of lanes in the, lane change direction, a range that the driver should check becomes wide, and thus the check time becomes long. In this manner, the check time becomes longer as the target to which the driver should pay attention increases or widens.

As another example, let us consider a case where the merge lane LM and the lane L1 are away from each other before the start position X of the merge zone as shown in FIG. 1. In this case, the driver cannot recognize in advance a geometry of the merge zone, the lanes L1 and L2. In addition, since the merge lane LM forms an angle with the lane L1, it is difficult for the driver to observe a situation of the lane L1 being a target of the lane change. Therefore, the check time becomes longer as compared with a case where the merge lane LM and the lane L1 are parallel to each other. In this manner, the check time becomes longer as the lane geometry becomes complicated.

Furthermore, the check time becomes longer as visibility of the surrounding situation becomes lower. For example, when a large truck is traveling on a side of the vehicle 1, a blind spot is large and thus the visibility is low. Moreover, the visibility is low also on a rainy day or at night. In such the situation where the visibility is low, the check time required for the driver to confirm safety becomes longer. Moreover, the driver's ability also affects the check time. For example, when driving experience of the driver is short, the check time tends to be long.

All of the attention target around the vehicle 1, the lane geometry, the visibility of the surrounding situation, and the driver's ability as exemplified above are included in the "driving environment" for the vehicle 1. As described above, the check time required for the driver to check the surrounding situation depends on the driving environment. Therefore, the autonomous driving system according to the present embodiment variably sets the delay time from the standard timing TA to the actual start timing TB according to the driving environment. More specifically, the delay time is set to increase as the check time depending on the driving environment becomes longer. As a result, the check time is reflected in the delay time. The driver can sufficiently check the surrounding situation during the delay time.

As described above, the autonomous driving system according to the present embodiment actively performs the delay processing even when it determines that the lane change can be started at the standard timing TA. By the delay processing, the actual start timing TB of the lane change is delayed from the standard timing TA for the delay time according to the driving environment. As much as the delay time, more time is secured for the driver to check the surroundings. As a result, the driver's senses of anxiety and strangeness at the start of the lane change are reduced, which contributes to increase in the driver's confidence in the autonomous driving system. It can be said that the present embodiment recognizes a difference between human and the autonomous driving system and provides a technique that can fill in the difference.

Hereinafter, the autonomous driving system according to the present embodiment will be described in more detail.

2. Configuration Example of Autonomous Driving System

Figure 2:
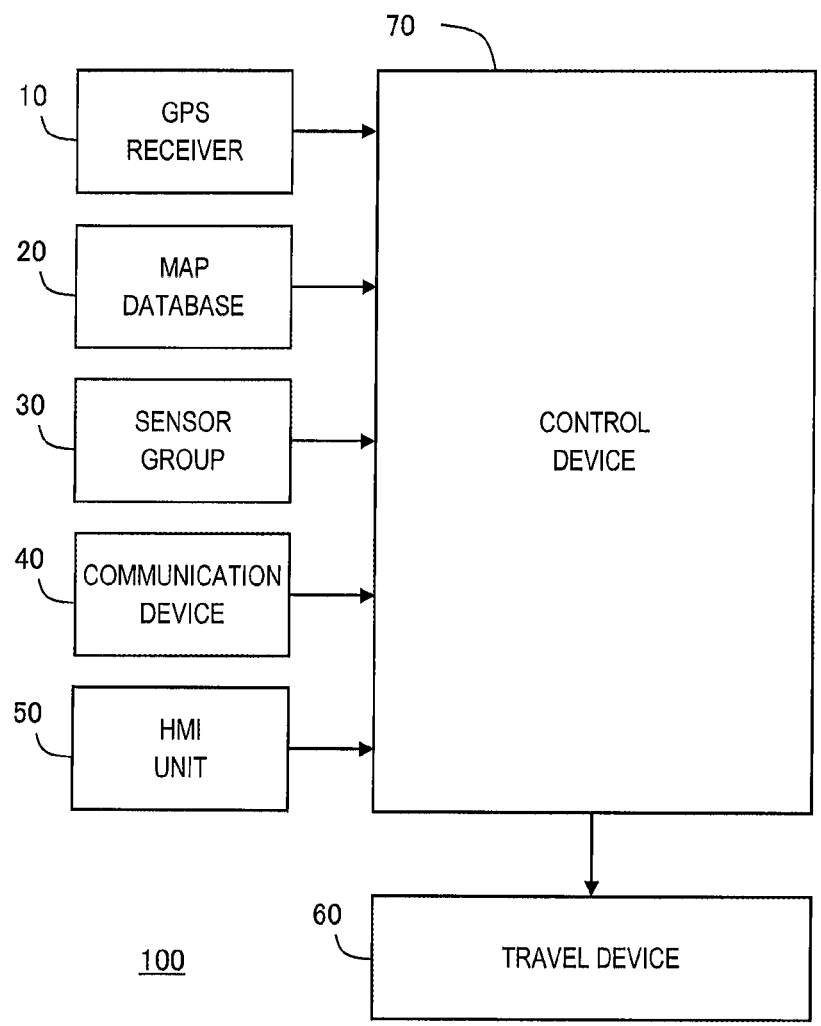
FIG. 2 is a block diagram showing a configuration example of the autonomous driving system according to the embodiment of the present disclosure.

FIG. 2 is a block diagram showing a configuration example of an autonomous driving system 100 according to the present embodiment. The autonomous driving system 100 is mounted on the vehicle 1 and controls the autonomous driving of the vehicle 1. More specifically, the autonomous driving system 100 is provided with a GPS (Global Positioning System) receiver 10, a map database 20, a sensor group 30, a communication device 40, an HMI (Human Machine Interface) unit 50, a travel device 60, and a control device 70.

The GPS receiver 10 receives signals transmitted from a plurality of UPS satellites and calculates a position and a posture (i.e. orientation) of the vehicle 1 based on the received signals. The GPS receiver 10 sends the calculated information to the control device 70.

Information indicating a boundary position of each lane on a map is beforehand recorded in the map database 20. The boundary position of each lane is represented by a group of plural points (i.e. a point group). Alternatively, the boundary position of each lane may be represented by a group of plural lines (i.e. a line group). The map database 20 is stored in a predetermined storage device.

The sensor group 30 detects a situation around the vehicle 1 and a travel state of the vehicle 1. The sensor group 30 is exemplified by a LIDAR (Laser Imaging Detection and Ranging), a radar, a camera, a brightness sensor, a vehicle speed sensor, and the like. The LIDAR uses laser lights to detect a target around the vehicle 1. The radar uses radio waves, to detect a target around the vehicle 1. The camera images a situation around the vehicle 1. The brightness sensor detects brightness at a position of the vehicle 1. The vehicle speed sensor detects a speed of the vehicle 1. The sensor group 30 sends the detected information to the control device 70.

The communication device 40 performs a V2X communication (i.e. a vehicle-to-vehicle communication and a vehicle-to-infrastructure communication). More specifically, the communication device 40 performs a V2V communication (a vehicle-to-vehicle communication) with another vehicle. In addition, the communication device 40 performs a V2I communication (a vehicle-to-infrastructure communication) with a surrounding infrastructure. Through the V2X communication, the communication device 40 can acquire information on an environment around the vehicle 1. The communication device 40 sends the acquired information to the control device 70.

The HMI (Human Machine Interface) unit 50 is an interface for proving the driver with information and receiving information from the driver. For example, the HMI unit 50 includes an input device, a display device, a speaker, and a microphone. The input device is exemplified by a touch panel, a keyboard, a switch, and a button. By using the input device, the driver can input information to the HMI unit 50. The HMI unit 50 sends the information input by the driver to the control device 70.

The travel device 60 includes a steering device, a driving device, a braking device, a transmission, and so forth. The steering device turns wheels. The driving device is a power source that generates a driving force. The driving device is exemplified by an engine and an electric motor. The braking device generates a braking force.

The control device 70 performs autonomous driving control that controls the autonomous driving of the vehicle 1. Typically, the control device 70 is a microcomputer including a processor, a memory, and an input/output interface. The control device 70 is also called an ECU (Electronic Control Unit). The control device 70 receives a variety of information through the input/output interface. The control device 70 performs the autonomous driving control based on the received information More specifically, the control device 70 creates a travel plan of the vehicle 1 and controls the travel device 60 so that the vehicle 1 travels according to the travel plan.

Figure 3:
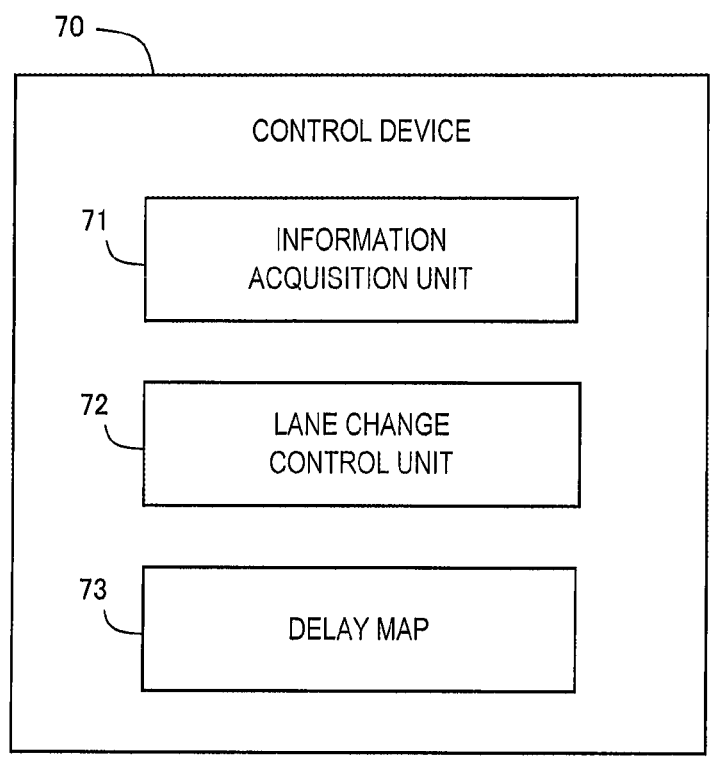
FIG. 3 is a block diagram showing a functional configuration example of a control device of the autonomous driving system according to the embodiment of the present disclosure.

FIG. 3 is a block diagram showing a functional configuration example of the control device 70 according to the present embodiment. In the present embodiment, we particularly consider "lane change control" among the autonomous driving control by the control device 70. The control device 70 includes an information acquisition unit 71 and a lane change control unit 72 as functional blocks relating to the lane change control. These functional blocks are achieved by the processor of the control device 70 executing a control program stored in the memory. The control program may be recorded on a computer-readable recording medium.

The information acquisition unit 71 performs "information acquisition processing" that acquires information necessary for the lane change control. The lane change control unit 72 performs "lane change control processing" that controls lane change of the vehicle 1. In the lane change control processing, the lane change control unit 72 refers to a delay map 73. The delay map 73 is stored in the memory of the control device 70. Hereinafter, each of the information acquisition processing and the lane change control processing in the present embodiment will be described in detail.

3. Information Acquisition Processing

Figure 4:
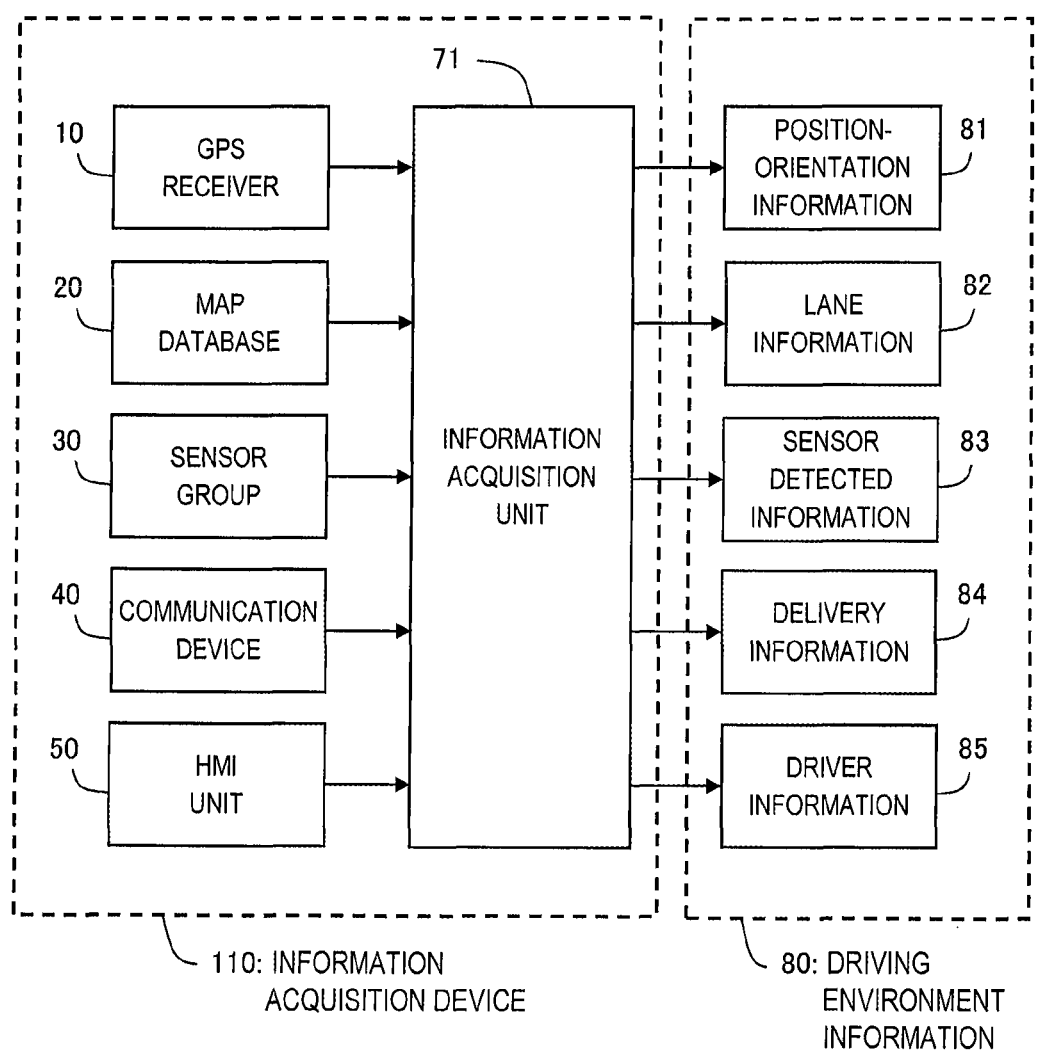
FIG. 4 is a block diagram for explaining information acquisition processing by the autonomous driving system according to the embodiment of the present disclosure.

FIG. 4 is a block diagram for explaining the information acquisition processing according to the present embodiment. In the information acquisition processing, the information acquisition unit 71 acquires information necessary for the lane change control. The information acquisition processing is repeatedly executed every certain cycle.

More specifically, the information acquisition unit 71 acquires, from the GPS receiver 10, position-orientation information 81 indicating a current position and a posture (i.e. orientation) of the vehicle 1.

Moreover, the information acquisition unit 71 reads the information regarding lanes from the map database 20 to generate lane information 82. The lane information 82 includes a geometry (i.e. position, shape, and orientation) of each lane on a map. Based on the lane information 82, the information acquisition unit 71 can recognize lane merging, lane branching, lane intersecting, and the like. Besides, the information acquisition unit 71 can also calculate a lane curvature, a lane width, and the like based on the lane information 82.

Moreover, the information acquisition unit 71 generates sensor detected information 83 based on the information detected by the sensor group 30. For example, the sensor detected information 83 includes the vehicle speed detected by the vehicle speed sensor. In addition, the sensor detected information 83 includes target information regarding the target around the vehicle 1. The target around the vehicle 1 includes a moving target and a stationary target. The moving target is exemplified by the surrounding vehicle 2 (see FIG. 1), a motorbike, a bicycle, a pedestrian, and so forth. Information regarding a moving target includes a position, a speed, and a size of the moving target. The stationary target is exemplified by a roadside structure, a white line, a traffic sign, and the like. Information regarding a stationary target includes a position and a size of the stationary target. Such the target information is generated based on the detected information obtained by the LIDAR, the radar, the camera, and the like. Furthermore, the sensor detected information 83 may include the brightness detected by the brightness sensor.

Moreover, the information acquisition unit 71 receives delivery information 84 through communication by the communication device 40. The delivery information 84 is information delivered from infrastructure and the like. Such the delivery information 84 is exemplified by weather information, roadwork section information, accident information, traffic regulation information, and so forth.

Moreover, the information acquisition unit 71 receives driver information 85 through the HMI unit 50. The driver information 85 is exemplified by an age and driving experience of the driver. The driver information 85 may include a variety of settings selected by the driver. The driver can beforehand register the driver information 85 in the autonomous driving system 100 by using the input device of the HMI unit 50.

All of the position-orientation information 81, the lane information 82, the sensor detected information 83, the delivery information 84, and the driver information 85 as exemplified above indicate the driving environment for the vehicle 1. Information indicating such the driving environment for the vehicle 1 is hereinafter referred to as "driving environment information 80". That is to say, the driving environment information 80 includes the position-orientation in 81, the lane information 82, the sensor detected information 83, the delivery information 84, and the driver information 85.

It can be said that the information acquisition unit 71 of the control device 70 has a function of acquiring the driving environment information 80. As shown in FIG. 4, the information acquisition unit 71 together with the GPS receiver 10, the map database 20, the sensor group 30, the communication device 40, and the HMI unit 50 constitute an "information acquisition device 110". The information acquisition device 110 as a part of the autonomous driving system 100 performs the information acquisition processing described above.

4. Lane Change Control Processing

Figure 5:
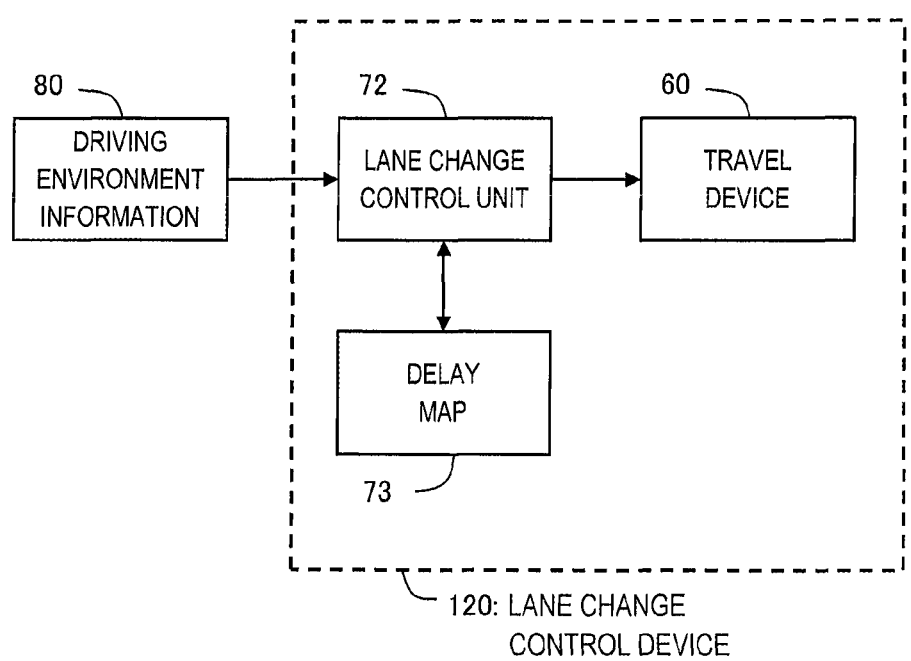
FIG. 5 is a Hock diagram for explaining lane change control processing by the autonomous driving system according to the embodiment of the present disclosure.
Figure 6:
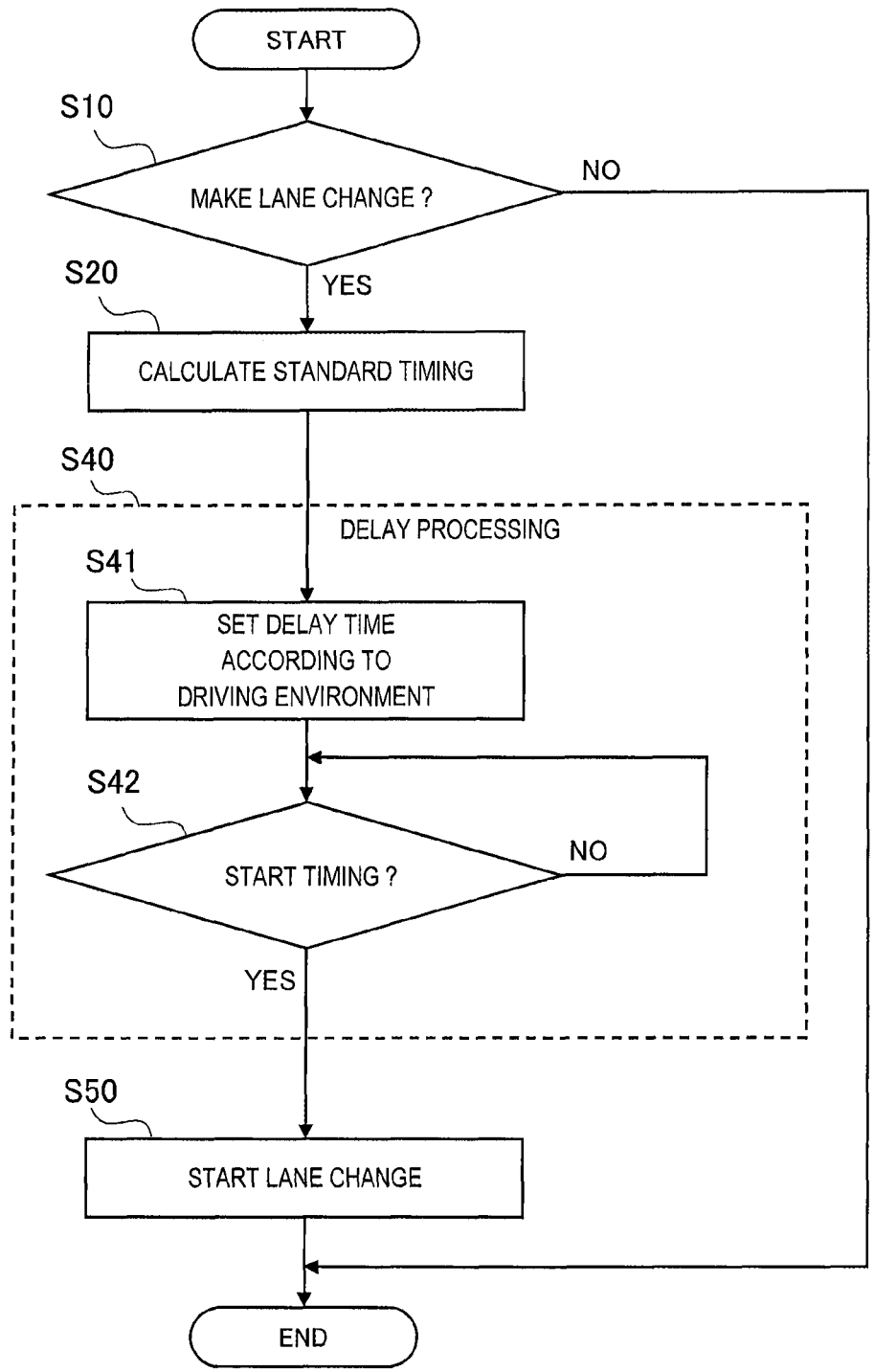
FIG. 6 is a flow chart showing the lane change control processing according to the embodiment of the present disclosure.

Based on the above-described driving environment information 80, the lane change control unit 72 performs the lane change control processing that controls lane change of the vehicle 1. FIG. 5 is a block diagram for explaining the lane change control processing. FIG. 6 is a flow chart for explaining the lane change control processing. The lane change control processing according to the present embodiment will be described with reference to FIGS. 5 and 6.

Step S10:

Based on the driving environment information 80, the lane change control unit 72 determines whether or not to make a lane change. For example, based on the position-orientation information 81 and the lane information 82, the lane change control unit 72 recognizes lane merging in front of the vehicle 1 as show in FIG. 1. In this case, the lane change control unit 72 decides to make a lane change in the merge zone.

As another example, based on the sensor detected information 83, the lane change control unit 72 recognizes an obstacle in front of the vehicle 1. The obstacle is exemplified by a stopped vehicle, a low-speed vehicle, a fallen object, and so forth. In this case, the lane change control unit 72 decides to make a lane change in order to avoid the obstacle.

As still another example, based on the position-orientation information 81 and the delivery information 84, the lane change control unit 72 recognizes a roadwork section or an accident vehicle in front of the vehicle 1. In this case, the lane change control unit 72 decides to make a lane change in order to avoid the roadwork section or the accident vehicle.

If there is no need to make a lane: change (Step S10; No), the lane change control processing ends. On the other hand, if it is decided to make a lane change (Step S10; Yes), the processing proceeds to Step S20.

Step S20:

The lane change control unit 72 calculates the standard timing TA at which the lane change can be started. For example, in the case of lane merging as shown in FIG. 1, the lane change control unit 72 recognizes, based en the position-orientation information 81 and the lane information 82, a geometry of each lane (i.e. the merge lane LM, the lanes L1 and L2), the start position X and a length of the merge zone, and so forth. Moreover, the lane change control unit 72 recognizes, based on the sensor detected information 83, a situation (i.e. a relative position, a relative speed, and the like) of the surrounding vehicle 2. Based on such the information, the lane change control unit 72 calculates the standard timing TA at which the lane change can be started.

As another example, in the case of avoiding an obstacle, the lane change control unit 72 calculates, based on the sensor detected information 83, a distance to the obstacle and a relative speed with respect to the obstacle. Moreover, the lane change control unit 72 recognizes, based on the sensor detected information 83, a situation (i.e. a relative position, a relative speed, and the like) of the surrounding vehicle 2. Based on such the information, the lane change control unit 72 calculates the standard timing TA at which the lane change can be started.

Besides the above, various examples can be considered as a method of calculating the standard timing TA (see, for example, Patent Literatures 1 and 2 mentioned above). In the present embodiment, the method of calculating the standard timing TA is not limited to a specific one.

Step S40:

After the Step S20, the lane change control unit 72 performs the delay processing. In the delay processing, the lane change control unit 72 delays the start timing TB of the lane change from the standard timing TA (see FIG. 1). That is, the lane change control unit 72 actively delays the actual start timing TB from the standard timing TA, even if it has determined that the lane change can be started at the standard timing TA.

More specifically, the lane change control unit 72 sets the delay time from the standard timing TA to the start timing TB (Step S41). Here, the lane change control unit 72 refers to the driving environment information 80 to set the delay time according to the driving environment. In other words, the lane change control unit 72 variably sets the delay time according to the driving environment.

For example, the lane change control unit 72 uses the delay map 73 to calculate the delay time. The delay map 73 indicates a relationship between an input parameter and the delay time. The input parameter is a parameter indicating the driving environment obtained from the driving environment information 80. As described above, the check time required for the driver to check the surrounding situation depends on the driving environment (i.e. the input parameter). The delay map 73 is designed such that the delay time increases as the check time becomes longer. It should be noted that design examples of the delay map 73 will be described later in detail.

The lane change control unit 72 acquires the input parameter based on the driving environment information 80. Then, the lane change control unit 72 refers to the delay map 73 to calculate the delay time according to the input parameter. The calculated delay time reflects the check time required for the driver to check the surrounding situation. Therefore, the driver can sufficiently check the surrounding situation during the delay time.

The lane change control unit 72 does not start the lane change until the delay time elapses from the standard timing TA, namely, the start timing TB arrives (Step S42; No). When the delay time has elapsed from the standard timing TA, namely, the start timing TB has arrived (Step S42; Yes), the processing proceeds to Step S50.

Step S50:

The lane change control unit 72 starts the lane change of the vehicle 1. More specifically, the lane change control unit 72 appropriately operates the travel device 60 to change a traveling direction of the vehicle 1.

It should be noted that as shown in FIG. 5, the lane change control unit 72, the delay map 73, and the travel device 60 constitute a "lane change control device 120". The lane change control device 120 as a part of the autonomous driving system 100 performs the lane change control processing described above.

5. Design Example of Delay Map

Various design examples of the delay map 73 will be described with reference to FIGS. 7 to 10. FIG. 7 shows examples where the input parameter the driving environment) mainly relates to a road. In the examples shown in FIG. 7, the input parameter is mainly acquired from the lane information 82.

As an example, the input parameter is a "lane relative angle". The lane relative angle is an angle between a current travel lane and a target lane of the lane change. In order to calculate the lane relative angle, for example, an average lane orientation of each of the travel lane and the target lane is calculated. For example, the average lane orientation is an average value of lane orientations in a certain section including a position corresponding to the standard timing TA. Respective average lane orientations of the travel lane and the target lane in an arbitrary coordinate system can be calculated by referring to the lane information 82. A difference between the respective average lane orientations corresponds to the lane relative angle.

In particular, in the case of lane merging or lane branching, the lane relative angle becomes large. As an example, let us consider the case of lane merging shown in FIG. 1. The merge lane LM (i.e. the travel lane) and the lane L1 (i.e. the target lane) are away from each other in a horizontal direction before the start position X of the merge zone, which results in a large lane relative angle. The same applies to a case where the merge lane LM and the lane L1 are away from each other in a vertical direction.

When the lane relative angle is large, a situation of the target lane is hard to observe from the travel lane. That is, as the lane relative angle becomes larger, visibility becomes lower and thus the check time becomes longer. Therefore, the delay map 73 is designed such that the delay time increases as the lane relative angle becomes larger.

As another example, the input parameter is the "number of lanes existing in the lane change direction". When the number of lanes becomes larger, a range that the driver should check becomes wider and thus the check time becomes longer. For example, when there are two lanes (e.g. L1 and L2 in FIG. 1) in the lane change direction, the check time becomes longer as compared with a case where there is only one lane (e.g. L1 in FIG. 1). Therefore, the delay map 73 is designed such that the delay time increases as the number of lanes becomes larger.

As still another example, the input parameter is a "lane curvature at the current position". When the vehicle 1 is cornering, a direction of the vehicle 1 changes from moment to moment and thus the driver's field of vision is not stable. It is difficult for the driver to recognize the surrounding situation, and thus, the check time becomes longer. Therefore, the delay map 73 is designed such that the delay time increases as the lane curvature becomes larger.

As still another example, the input parameter is a "lane width". When the lane width becomes smaller, the driver checks more carefully in order to avoid collision, and thus the check tune becomes longer. Therefore, the delay map 73 is designed such that the delay time increases as the lane width becomes smaller.

As still another example, the input parameter is a "visibility level of a white line". For example, the visibility level of the white line becomes lower as the white line is more faded. The visibility level of the white line can be calculated by well-known white line recognition processing that uses the position-orientation information 81, the lane information 82, and the sensor detected information 83 (specifically, an image imaged by the camera). When the visibility level of the white line becomes lower, the driver checks more carefully and thus the check time becomes longer. Therefore, the delay map 73 is designed such that the delay time increases as the visibility level becomes lower.

FIG. 8 shows examples where the input parameter (i.e. the driving environment) mainly relates to a surrounding vehicle 2. In the examples shown in FIG. 8, the input parameter is mainly acquired from the sensor detected information 83.

As an example, the input parameter is the "number of surrounding vehicles 2". Here, the number of surrounding vehicles 2 is the number of surrounding vehicles 2 existing in a certain range around the vehicle 1. The surrounding vehicles 2 may be limited to those existing in the lane change direction. When the number of surrounding vehicle 2 becomes larger, the driver needs to pay attention to respective behaviors of the surrounding vehicles 2, and thus the check time becomes longer. Moreover, when the number of surrounding vehicles 2 becomes larger, a blind spot increases and thus it becomes harder to check the surrounding situation. Therefore, the delay map 73 is designed such that the delay time increases as the number of surrounding vehicles 2 becomes larger.

As another example, the input parameter is an "inter-vehicle distance (i.e. a distance between surrounding vehicles 2) in the target lane". When trying to cut into a narrow inter-vehicle space, the driver checks more carefully and thus the check time becomes longer. Therefore, the delay map 73 is designed such that the delay time increases as the inter-vehicle distance becomes smaller.

As still another example, the input parameter is a "distance between the vehicle 1 and a surrounding vehicle 2". When a surrounding vehicle 2 exists near the vehicle 1, the driver checks moor carefully and thus the check time becomes longer. In addition, when a surrounding vehicle 2 exists near the vehicle 1, a blind spot increases and thus it becomes harder to check the surrounding situation. Therefore, the delay map 73 is designed such that the delay time increases as the distance becomes smaller.

As still another example, the input parameter is a "size of surrounding vehicle 2". Here, the size of surrounding vehicle 2 is a size of surrounding vehicle 2 existing in a certain range around the vehicle 1. The surrounding vehicle 2 may be limited to that existing in the lane change direction. When the size of surrounding vehicle 2 becomes larger, a blind spot increases and thus it becomes harder to check the surrounding situation. In other words, visibility becomes lower as the size of surrounding vehicle 2 becomes larger. Therefore, the delay map 73 is designed such that the delay time increases as the size becomes larger.

As still another example, the input parameter is a "relationship between a surrounding vehicle 2 and a lane". When a surrounding vehicle 2 is making a lane change or a surrounding vehicle 2 travels while departing from a lane, the driver pays attention to a behavior of the surrounding vehicle 2, and thus the check time becomes longer. Therefore, the delay map 73 is designed such that the delay time becomes larger when the surrounding vehicle 2 is on the lane boundary while the delay time becomes smaller when the surrounding vehicle 2 is within the lane. It should be noted that the input parameter of the present example is acquired based on the sensor detected information 83 and the lane information 82.

As still another example, the input parameter is a "type of a moving target". Let us consider a case where a detected moving target around the vehicle 1 is other than a vehicle (e.g. motorbike, bicycle, pedestrian, animal). In this case, the driver checks more carefully and thus the check time becomes longer, as compared with a case where the moving target is a vehicle. Therefore, the delay map 73 is designed such that the delay time increases when the moving target is other than a vehicle.

FIG. 9 shows examples where the input parameter (i.e. the driving environment) relates to other external factors.

As an example, the input parameter is "weather". Visibility is high when it is sunny or cloudy, while visibility is low in a case of rain or snow. When the visibility becomes lower, the check time becomes longer. Therefore, the delay map 73 is designed such that the delay time increases as the visibility becomes lower. It should be noted that the input parameter of the present example can be acquired based on the delivery information 84 (specifically, the weather information) or the sensor detected information 83 (specifically, the brightness detected by the brightness sensor).

As another example, the input parameter is an "hour". Visibility is high during a daytime, while visibility is low at night. When the visibility becomes lower, the check time becomes longer. Therefore, the delay map 73 is designed such that the delay time increases as the visibility becomes tower. It should be noted that the input parameter of the present example can be acquired based on the time information or the sensor detected information 83 (specifically, the brightness detected by the brightness sensor).

As still another example, the input parameter is an "abnormal event". Here, the abnormal event means an event that does not exist usually. For example, the abnormal event includes a roadwork section, an accident vehicle, a failed vehicle, and so forth. When there is any abnormal event, the driver checks more carefully and thus the check time becomes longer. Therefore, the delay map 73 is designed such that the delay time increases when there is any abnormal event. It should be noted that the input parameter of the present example can be acquired based on the delivery information 84 (specifically, the roadwork section information, the accident information, and the traffic regulation information) or the sensor detected information 83 (specifically, the target information).

FIG. 10 shows examples where the input parameter (i.e., the driving environment) mainly relates to the driver. In the examples shown in FIG. 10, the input parameter is mainly acquired from the driver information 85.

As an example, the input parameter is an "age of the driver". In a case of elderly people, a recognition speed is low and thus the check time becomes longer. Therefore, the delay map 73 is designed such that the delay time increases as the age becomes older.

As another example, the input parameter is "driving experience of the driver". When the driving experience is short, the check time tends to be long. Therefore, the delay map 73 is designed such that the delay time increases as the driving experience becomes shorter.

As still another example, the input parameter is "driver's setting". For example, the driver uses the HMI unit 50 to select, either "preference to leeway" or "preference to quickness". The delay map 73 is designed such that the delay time becomes larger in the case of the "preference to leeway" while the delay time becomes smaller in the case of the "preference to quickness".

At least one of the input parameters exemplified above is used as the input parameter for the delay map 73. A combination of arbitrary plural input parameters may be used. It should be noted that the is parameter can be, acquired at the standard timing TA at the latest.

6. Effects

The autonomous driving system 100 (the lane change control device 120) according to the present embodiment actively performs the delay processing even when it determines that the lane change can be started at the standard timing TA. By the delay processing, the actual start timing TB of the lane change is delayed from the standard timing TA. Here, the delay time is variably set according to the driving environment. As roach as the delay time, more time is secured for the driver to check the surroundings. As a result, the driver's senses of anxiety and strangeness at the start of the lane change are reduced, which contributes to increase in the driver's confidence in the autonomous driving system 100. It can be said that the present embodiment recognizes a difference between human and the autonomous driving system 100 and provides a technique that can fill in the difference.

7. Modification Example

In a modification example of the present embodiment, "urgency" of the lane change is taken into consideration. It the urgency exceeds threshold, the lane change control device 120 immediately starts the lane change without waiting for the start timing TB. The details are as follows.

Figure 11:
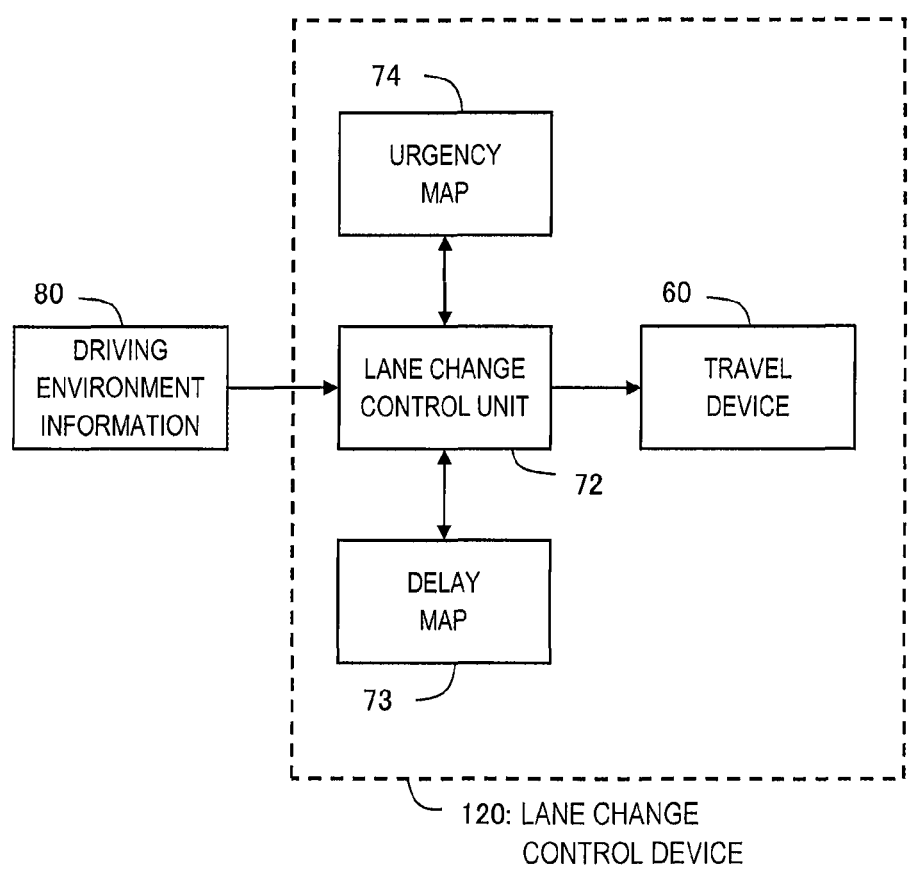
FIG. 11 is a block diagram showing a functional configuration example of a lane change control device according to a modification example of the embodiment of the present disclosure.

FIG. 11 is a block diagram showing a functional configuration example of the lane change control device 120 according to the present modification example. As compared with the functional configuration shown in the foregoing FIG. 5, the lane change control device 120 further has an urgency map 74. The urgency map 74 indicates, a relationship between an input parameter and the urgency. The lane change control device 120 (i.e. the lane change control unit 72) is able to calculate the urgency by using the urgency map 74. Design examples of the urgency map 74 are as follows.

As an example, the input parameter is a distance to an end point of a zone in which the lane change should be done. For example, in the case of the lane merging shown in FIG. 1, the lane change needs to be done by the end point of the merge zone (i.e., the end point of the merge lane LM). As another example, in a case of lane branching, it may be necessary to make a lane change to a branch lane in order to arrive at a destination. The input parameter of the present example can be acquired based on the position-orientation information 81 and the lane information 82. The urgency map 74 is designed such that the urgency becomes higher as the distance to the end point becomes smaller.

As another example, the input parameter is an expected arrival time to an obstacle existing ahead. The input parameter of the present example can be acquired based on the sensor detected information 83 (specifically, the position and the relative speed of the obstacle existing ahead). The urgency map 74 is designed such that the urgency becomes higher as the expected arrival time becomes shorter.

As still another example, the input parameter is a type of an obstacle existing ahead. The input parameter of the present example can be acquired based on the sensor detected information 83 (specifically, an image imaged by the camera). The urgency map 74 is designed such that the urgency becomes higher when the obstacle existing ahead is a pedestrian or an animal.

Figure 12:
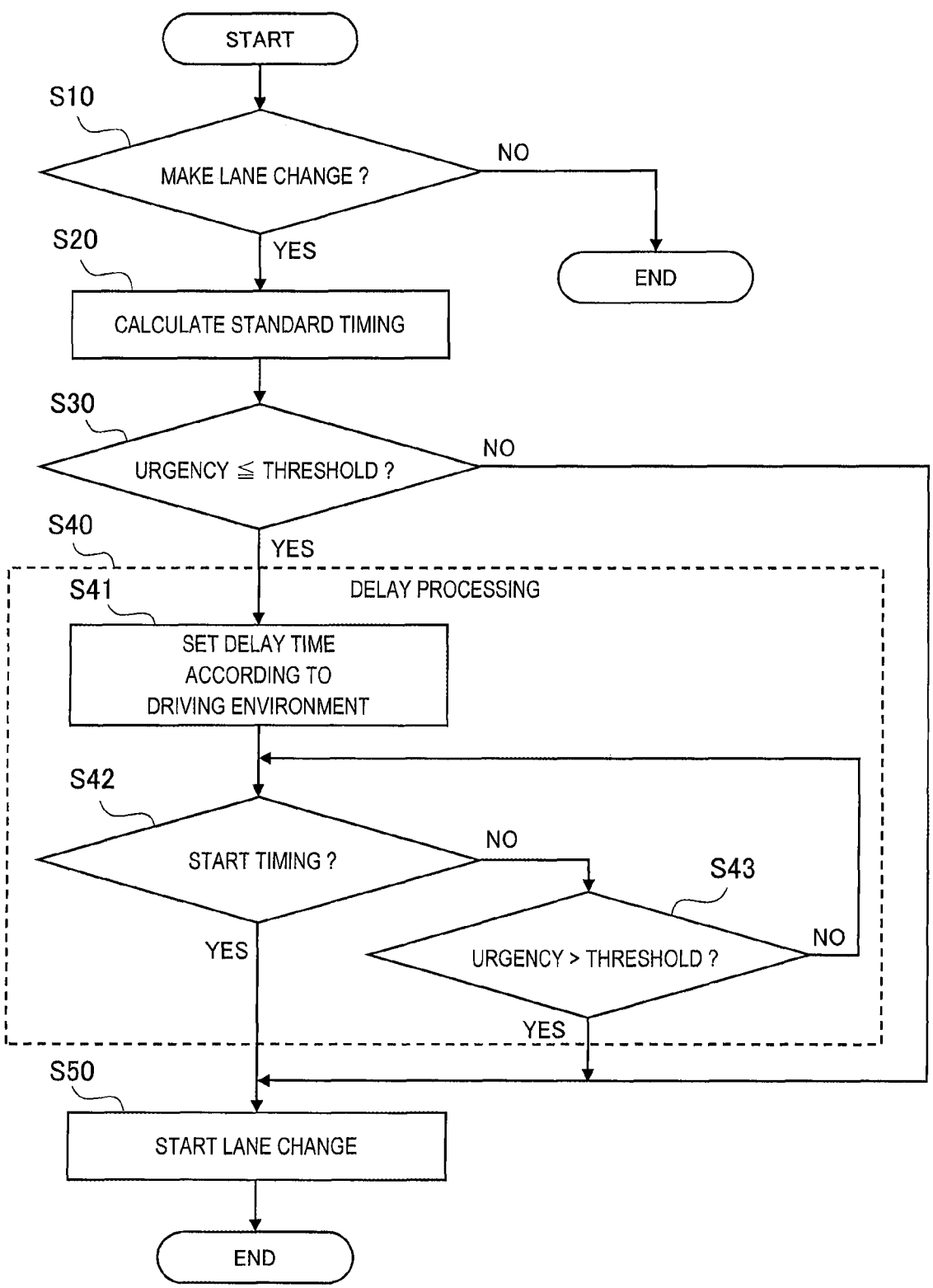
FIG. 12 is a flow chart showing the lane change control processing according to the modification example of the embodiment of the present disclosure.

FIG. 12 is a flow chart showing the lane change control processing according to the present modification example. Overlapping description with the foregoing FIG. 6 will be omitted as appropriate. According to the present modification example, Step S30 is added between Step S20 and Step S40. In Step S30, the lane change control device 120 (i.e. the lane change control unit 72) calculates the urgency based on the driving environment information 80 and the urgency map 74, and compares the calculated urgency with threshold. If the urgency is equal to or less than the threshold (Step S30; Yes), the above-described delay processing (Step S40) is performed. On the other hand, if the urgency exceeds the threshold (Step S30; No), the lane change control device 120 skips the delay processing and immediately starts the lane change (Step S50).

Moreover, the urgency is monitored during the delay processing (Step S40). For that purpose, Step S43 is added to the delay processing as shown in. FIG. 12. In Step S43, the urgency calculation and comparison are performed as in the case of Step 330. If the urgency is equal to or less than the threshold (Step S43; No), the above-described Step S42 is repeated. On the other hand, if the urgency exceeds the threshold (Step S43; Yes), the lane change control device 120 terminates the delay processing and immediately starts the lane change (Step S50).

According to the present modification example, as described above, when the urgency exceeds the threshold, the autonomous driving system 100 immediately starts the lane change without waiting for the start timing TB. As a result, safety is improved.

What is claimed is:

1. An autonomous driving system comprising:
an information acquisition device configured to acquire driving environment information indicating a driving environment for a vehicle; and
a lane change control device configured to control lane change of the vehicle based on the driving environment information,
wherein when determining that the lane change can be started at a standard timing, the lane change control device performs delay processing that delays an actual start timing of the lane change from the standard timing, and
the lane change control device variably sets a delay time from the standard timing to the actual start timing according to a check time for a driver to check the driving environment.

2. The autonomous driving system according to claim 1, wherein the driving environment includes an angle between a current travel lane and a target lane of the lane change, and
the delay time increases as the angle becomes larger.

3. The autonomous driving system according to claim 1, wherein the driving environment includes a number of lanes existing in a direction of the lane change, and
the delay time increases as the number of lanes becomes larger.

4. The autonomous driving system according to claim 1, wherein the driving environment includes a curvature of a lane at a current position, and
the delay time increases as the curvature becomes larger.

5. The autonomous driving system according to claim 1, wherein the driving environment includes a number of surrounding vehicles, and
the delay time increases as the number of surrounding vehicles becomes larger.

6. The autonomous driving system according to claim 1, wherein the driving environment includes an inter-vehicle distance in a target lane of the lane change, and
the delay time increases as the inter-vehicle distance becomes smaller.

7. The autonomous driving system according to claim 1, wherein the driving environment includes a relationship between a surrounding vehicle and a lane, and
the delay time when the surrounding vehicle is on a boundary of the lane is larger than the delay time when the surrounding vehicle is within the lane.

8. The autonomous driving system according to claim 1, wherein the driving environment includes visibility that depends on weather or hour, and
the delay time increases as the visibility becomes lower.

9. The autonomous driving system according to claim 1, wherein the driving environment includes a driving experience of a driver, and the delay time increases as the driving experience is shorter.

10. The autonomous driving system according to claim 1, wherein when urgency of the lane change exceeds a threshold, the lane change control device starts the lane change without waiting for the start timing.

11. The autonomous driving system according to claim 1, wherein the check time depends on the driving environment, and the lane change control device variably sets the delay time such that the delay time increases as the check time becomes longer.

12. An autonomous driving system comprising:

an information acquisition device configured to acquire driving environment information indicating a driving environment for a vehicle; and a lane change control device configured to control lane change of the vehicle based on the driving environment information, wherein when determining that the lane change can be started at a standard timing, the lane change control device performs delay processing that delays an actual start timing of the lane change from the standard timing, the lane change control device variably sets a delay time from the standard timing to the actual start timing according to the driving environment, the driving environment includes a number of surrounding vehicles, and the delay time increases as the number of surrounding vehicles becomes larger.

\* \* \* \* \*

UNITED STATES PATENT AND TRADEMARK OFFICE
CERTIFICATE OF CORRECTION

PATENT NO. : 10,562,532 B2
APPLICATION NO. : 15/729141
DATED : February 18, 2020
INVENTOR(S) : Ryuta Hashimoto and Yoshinori Watanabe Page 1 of 1

It is certified that error appears in the above-identified patent and that said Letters Patent is hereby corrected as shown below:

In the Specification

Column 1, Line 32, delete "it" and insert --if--, therefor.

Column 3, Line 18, delete "diselosuredisclosure" and insert --disclosure--, therefor.

Column 6, Line 33, delete "information More" and insert --information. More--, therefor.

Column 8, Line 37, delete "lane: change" and insert --lane change--, therefor.

Column 8, Line 45, after "based", delete "en" and insert --on--, therefor.

Column 9, Line 61, delete "parameter the" and insert --parameter (i.e. the--, therefor.

Column 11, Line 23, delete "moor" and insert --more--, therefor.

Column 12, Line 12, delete "tower" and insert --lower--, therefor.

Column 14, Line 5, delete "330" and insert --S30--, therefor.

Signed and Sealed this
Seventh Day of April, 2020

Andrei Iancu
*Director of the United States Patent and Trademark Office*